United States Patent [19]
Goto

[11] Patent Number: 6,120,207
[45] Date of Patent: *Sep. 19, 2000

[54] CONNECTOR AND METHOD FOR CONNECTING BUILDING STRUCTURES USING CONNECTOR

[75] Inventor: Yasuo Goto, Oita-ken, Japan

[73] Assignee: Home Co., Ltd., Oita-ken, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/505,223

[22] PCT Filed: Dec. 15, 1994

[86] PCT No.: PCT/JP94/02107

§ 371 Date: Aug. 15, 1995

§ 102(e) Date: Aug. 15, 1995

[87] PCT Pub. No.: WO95/16834

PCT Pub. Date: Jun. 22, 1995

[30] Foreign Application Priority Data

Dec. 15, 1993 [JP] Japan .................................. 5-355330

[51] Int. Cl.[7] .................................................... F16B 13/00
[52] U.S. Cl. ........................... 403/268; 403/230; 403/292
[58] Field of Search ..................... 403/265, 266, 403/267, 268, 269, 6, 292, 294, 230, 245; 285/190, 133.4, 133 FR; 52/655.1, 656.9, 726.1, 653.2

[56] References Cited

U.S. PATENT DOCUMENTS

| | | | |
|---|---|---|---|
| 1,825,034 | 9/1931 | Weatherhead, Jr. | 285/133.4 X |
| 3,461,539 | 8/1969 | Napple | 403/267 X |
| 4,137,115 | 1/1979 | Lambert | 403/268 X |
| 4,373,829 | 2/1983 | Braxell | 403/266 X |
| 4,630,959 | 12/1986 | Glaser | 403/266 |
| 4,925,331 | 5/1990 | Bertsche | 423/266 X |
| 5,383,740 | 1/1995 | Lancelot, III | 403/267 |
| 5,466,086 | 11/1995 | Goto | 403/267 X |
| 5,560,174 | 10/1996 | Goto | 403/267 X |
| 5,575,129 | 11/1996 | Goto | 403/268 X |

FOREIGN PATENT DOCUMENTS

| | | | |
|---|---|---|---|
| 71553 | 10/1950 | Denmark | 285/190 |
| 2218483 | 11/1989 | United Kingdom | 403/266 |

*Primary Examiner*—Harry C. Kim
*Attorney, Agent, or Firm*—Lane, Aitken & McCann LLP

[57] ABSTRACT

It is an object of the present invention to provide a connector in which a strong connection can be carried out with a simple working method, a removal of the connector is eliminated, its workability is remarkably improved, a productivity of building structure is improved, an instantaneous breakage caused by earthquake and the like is prevented and a remarkable anti-disaster effect is attained. The connector (1) of the present invention is comprised of the rod-like member (2), one or two arcular convex walls (8) cooperatively connected to one end of the rod-like member (2) in a longitudinal direction, the hollow part (3) formed from one end to the other end of the rod-like member (2), the insertion hole for fixing member (9) formed at the convex walls (8), and a hollow branch pipe (12) fixed to or removably engaged with the opening of the hollow part (3) at the other end of the rod-like member (2).

14 Claims, 13 Drawing Sheets

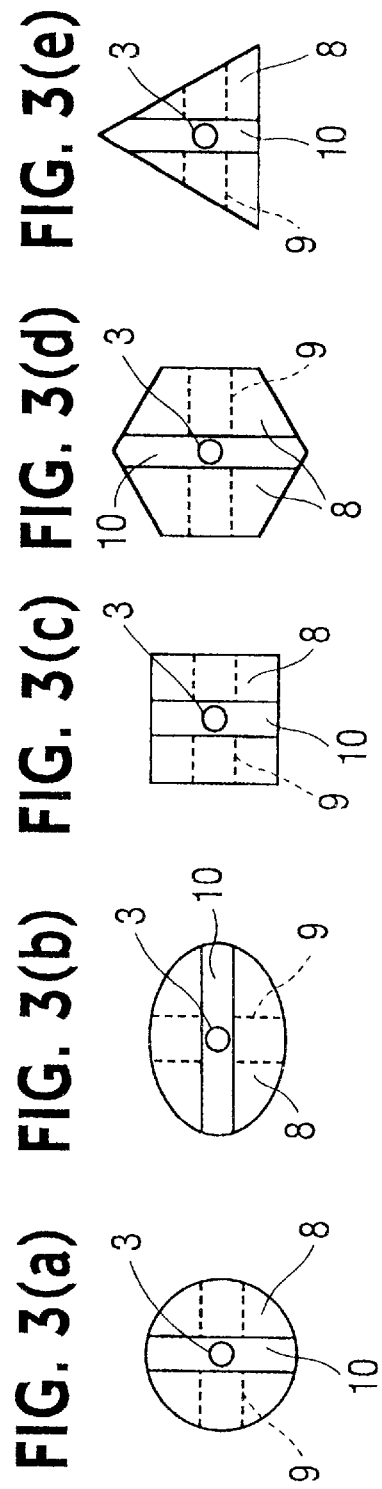
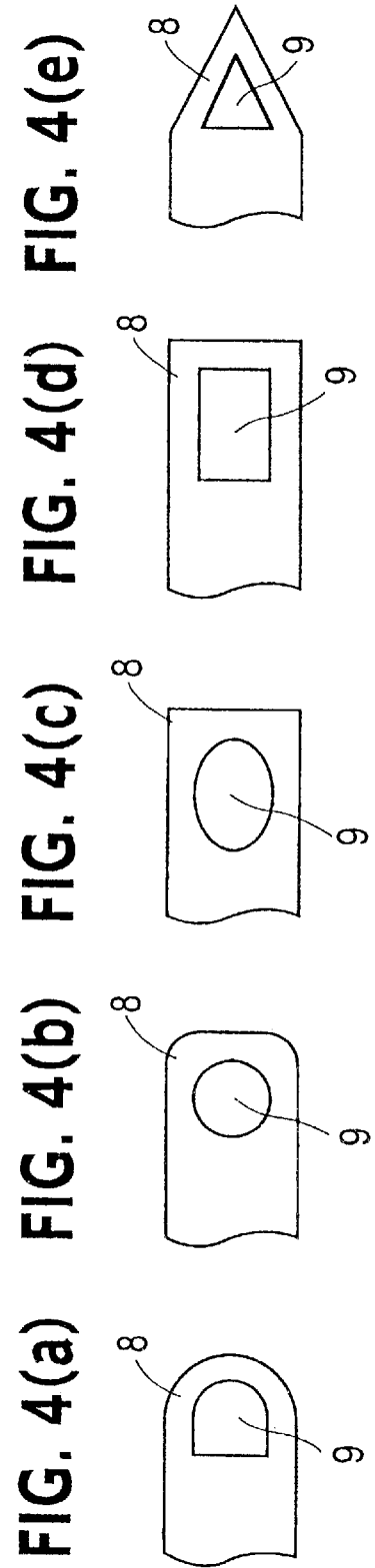

CONNECTOR AND METHOD FOR CONNECTING BUILDING STRUCTURES USING CONNECTOR

BACKGROUND OF THE INVENTION

1. Technical Field of the Invention

This invention relates to a connector for use in connecting between wooden materials, laminated wood or stone materials, or connecting between a wooden material or laminated wood and a stone material or concrete, and a method for connecting in a building structure in a joint or a coupler structure of a building structure such as a wooden house and a framework structure in a large-sized wooden building with large size structure.

2. Background of the Related Art

In recent years, there have been developed to provide a connector for connection between a beam and a pole plate, a pole beam and a column, and a lateral beam and an independent column (long column) aiming at labor saving and rationalization in building construction work for a dwelling and the like or a joint structure or a coupler structure and the like aiming at a rationalization of construction work.

For example, (1) Japanese Utility Model Laid-Open No. Sho 63-162008 discloses a framework fitting used in a wooden framework construction method, (2) Japanese Utility Model Laid-Open No. Hei 2-93401 discloses a reinforcing fitting for a joint part between a lower end of the column and a foundation of a framework wooden building, (3) Japanese Patent Laid-Open No. Hei 3-295946 discloses a crown dowel fitting and a lathing structure of a framework wooden building using the fitting, and (4) Japanese Patent Laid-Open No. Hei 2-300442 discloses a joint structure of wooden construction member in which the wooden framework may not be disassembled after connection. In these related art, the fittings, bolts, and nuts are used for connecting the structural members. As the joint structure, the joint structure in a wooden framework structure aiming at improving a structural strength at the joint structure is disclosed in Japanese Patent Laid-Open Nos. Sho 63-14939, 63-14940 and 63-14941, respectively.

However, the above-mentioned related art connector or joint structure had a problem that a large number of parts such as bolts, nuts or washers were used during the work, their fixing work was complicated and the process was lack of workability. In addition, the prior art had a problem that the fitting was large size, heavy in weight, lacked in transporting characteristic and further lacked in safety characteristic at a high elevated location.

In addition, the prior art had some problems that an erroneous fitting for the fitting and the like occurred to require a certain trouble, it was hard to bury the fitting to a predetermined location in the cylinder or the plug member punched at the predetermined location and make a threadable fitting of bolts to the punched holes in the aforesaid buried cylinder or plug, resulting in that its workability was poor, it required a large number of steps of work and it required a long work period.

The assembly in which the wooden members were fixed with nuts had some problems that their fastening force was lost in several years due to a shrinkage of the wood, looseness could easily occur and their physical strength was reduced. Additionally, there were some problems that metallic portions such as bolts, nuts or fittings were oxidized by dew and the like, their durability was lost and at the same time the imported wood contained salt due to storage on the sea, the bolts or fittings and the like were decayed to deteriorate physical strength and at the same time durability was lost.

In addition, the prior art system had some problems in disaster prevention that the external connecting bolts or fittings were melted during fire, their strength could not be expected and a housing might be fallen. In addition, the maximum disadvantage of the framework structure using wooden members was brittleness at the connection part, various kinds of joints or couplers were devised in the past by the carpenters and the like in order to keep a physical strength. However, all these structures had some problems that they were complex, their machining required a large amount of steps and they showed a poor productivity. In addition, the prior art had some problems that the wood with large size was poor in its production volume, its availability was difficult and a long and large span beam arch or truss made of wood or laminated wood and the like could not be transported under the traffic regulation and the like.

In view of the foregoing, the present inventor earnestly studied the aforesaid problems of the prior art and completed the connector in which the complex joint or coupler structure of the prior art is of quite simple structure, its structural strength is improved by using it together with adhesive agent, a connecting workability for the joint or the coupler is remarkably increased, working period can be remarkably shortened; a method for connecting structural members in which the joint, coupler or connection machining engineering is simplified by using the connector, the number of working steps is remarkably reduced and its productivity is superior; and a connecting structure between the structural members in which a high structural strength can be attained and a high disaster-proof characteristic is also obtained, and finally filed the Patent Application Nos. Hei 4-164402, Hei 5-112261, Hei 5-117908, Hei 5-139937, Hei 5-294289 and Hei 5-294748.

However, it was found that although the aforesaid inventions have remarkably improved workability, working characteristic and productivity as compared with those of the prior art fittings or working methods and they are remarkably superior in view of effect of anti-disaster or increasing of withstand force, it had the following problems in view of anti-disaster characteristic.

That is, it was found that if bending, tension, compression and shearing and the like act on the structural members such as wooden members, the adhesive agent integrally formed with the connector resists against bending, tension, compression and shearing and the like up to a limit in which the wood is broken, thereafter the adhesive agent and the timber fiber are cut to produce a primary breakage, resulting in that their connecting power is lost and the breakage advances. In particular, it was found that the prior art system had a problem in which the connection part between the structural members in the region having frequent occurrence of earthquake, the portions with weak withstand force are broken in sequence, accumulated and then a housing is damaged abruptly by earthquake and the like.

In addition, the inventor completed in the patent application (Japanese Patent Application No. Hei 5-112261) filed previously the connector in which an end part of the flowing-out pipe for the adhesive agent is formed with a projection. In this case, it was possible to prevent the connector from being fallen or from being rotated by this projection when the connector is inserted, resulting in that its workability could be remarkably increased. When the adhesive agent was fed under pressurized condition in order to perform a smooth returning-back of the adhesive agent, it was found that there was a problem that a certain number of connectors were pushed out in response to a size or a shape of the connector, and when an adhesive agent gun was pulled out, a certain number of connectors were pulled out together with the gun if the diameter of the connection hole was large and then a workability was reduced a little.

In addition, furniture such as closets or chairs, doors or various fittings, playing elements such as jungle gyms or sliders and wooden curved dolls and other fittings having thick-wall portions had some problems that their connecting strength was weak and they lacked in durability due to the fact that each of the members was merely adhered with adhesive agent or merely adhered after a simple process.

DISCLOSURE OF THE INVENTION

The present invention resolves the aforesaid problems in the prior art and it is an object of the present invention to provide the connector for a building structure in which a more powerful connection can be realized by a simple working method, a removal of the connector is eliminated, working characteristic is remarkably improved, a productivity of a building structure is improved and at the same time an instantaneous breakage of it is prevented and further it has a superior anti-disaster effect; or the connector in which furniture or fittings, playing elements, toys can be adhered and fixed by a simple work and their durability can be remarkably improved; and a method for connecting building structures in which its mechanical strength is superior, its working operation can be substantially improved and its working period can be remarkably reduced.

In order to accomplish the objects above, the present invention is comprised of the following constitutions.

The connector described in one embodiment has a constitution comprising a rod-like member; one or two arcular convex walls cooperatively arranged at one longitudinal end of said rod-like member; a hollow part formed from one end of said rod-like member to the other end thereof; insertion holes for fixing member formed at said convex walls; and a hollow branch pipe fixed to or removably engaged with an opening of said hollow part at the other end of said rod-like member.

The connector described in another embodiment has a constitution comprising a rod-like member; one or two arcular convex walls cooperatively arranged at each longitudinal ends of said rod-like member; a hollow part communicated between both ends of said rod-like member and opened at both ends; insertion holes for fixing member formed at said convex walls; adhesive agent flowing-in holes formed to be communicated from an intermediate part of said hollow part with an outer circumferential wall of said rod-like member; and a hollow branch pipe fixed to or removably engaged with said adhesive agent flowing-in hole. The connector described in an embodiment of the invention has a constitution comprising a rod-like member; a hollow part formed from one end of said rod-like member to a predetermined longitudinal part; one or a plurality of adhesive agent flowing-out holes passed from one end of said hollow part to an outer surface of said rod-like member; insertion hole for fixing member formed between said adhesive agent flowing-out holes and the other end of said rod-like member and at a substantial crossing in right angle in a longitudinal direction of said rod-like member; and a hollow branch pipe fixed to or removably engaged with an opening of said hollow part at one end of said rod-like member.

The connector described in an embodiment of the invention has a constitution comprising a rod-like member; the insertion holes for fixing member formed near both ends of said rod-like member and at a substantial crossing in right angle in a longitudinal direction of said rod-like member; a hollow part communicated between both ends of said rod-like member and opened at both ends; one or a plurality of adhesive agent flowing-out holes inside each of crossing parts between said insertion holes for fixing member and said hollow part and communicated from said hollow part with an outer circumferential wall of said rod-like member; one adhesive agent flowing-in hole formed to be passed from a intermediate part of said hollow part in a longitudinal direction to an outer circumferential wall of said rod-like member; and a hollow branch pipe fixed to or removably engaged with said adhesive agent flowing-in hole.

The connector described in an embodiment of the invention has a constitution comprising a rod-like member; a hollow part formed from one end of said rod-like member to the other end thereof; an insertion hole for fixing member formed at one end of said rod-like member; and a hollow branch pipe fixed to or removably engaged with an opening of said hollow part of the other end of said rod-like member.

The connector described in an embodiment of the invention has a constitution comprising a rod-like member; a hollow part communicated between both ends of said rod-like member and opened at both ends; an insertion holes for fixing member formed at both ends of said rod-like member; an adhesive agent flowing-in hole formed to be communicated from an intermediate part of said hollow part to an outer circumferential wall of said rod-like member; and a hollow branch pipe fixed to or removably engaged with said adhesive agent flowing-in hole.

The connector an embodiment of the invention claim has a constitution in which the end part of said opening of the fixing part side or the engaging part side of the branch pipe at said opening of said hollow part of said rod-like member is provided with a projection or a flange part having a recess displayed the direction of said insertion hole for fixing member formed in a crossing direction with an opening direction of said insertion hole for fixing member or in parallel with it.

The connector described in claim 8 according to any one of claims 1 to 7 has a constitution in which the surface of said rod-like member is formed with a projection part or a convex or a concave part.

A method for connecting a building structure described in claim 9 has a constitution comprising the steps of inserting and fixing said connector between two or more structural members provided with connection holes for inserting and fixing a rod-like member of said connector; inserting said fixing member into the insertion hole for fixing member passed through an extremity end of said connection hole from an outer wall part of the structural member and into the insertion hole for fixing member formed at an end part of said rod-like member of adhesive agent flowing-out side or convex walls cooperatively connected to the end part; fixing said rod-like member to said insertion hole for fixing member; burying an insertion and fixing plug to said insertion and fixing part; feeding adhesive agent from the adhesive agent flowing-in part of the hollow part of said connector, flowing out said adhesive agent from the adhesive agent flowing-out hole of said rod-like member, filling the adhesive agent to a clearance between said rod-like member and the connection hole communicated between each of said structural members and returning the adhesive agent to the adhesive agent flowing-in part side; and burying a plug into an opening of said connection hole.

In this case, the rod-like member of the connector is made of metals such as iron or alloy like brass, molded and machined product of complex material having organic or non-organic fibers such as carbon fiber, boron fiber, glass fiber or metallic fiber and synthetic resin, wooden, bamboo, reinforced wooden material or reinforced bamboo reinforced by acetylation agent and the like and ceramics using cement and the like and its complex product. The sectional shape of the rod like member is of a substantial circle, a substantial ellipse, or polygonal shapes such as triangle, square, hexagon. Length or diameter of the rod-like member can be properly selected in reference to a thickness or a size of the structural member. One end of the rod-like member may be of solid part in response to a connecting structure between the structural members, adhesive agent is poured into the hollow part from a predetermined location of the rod-like member in a longitudinal direction and further the extremity end of the other end may be provided with the adhesive agent flowing-out holes so as to facilitate a utilization of the solid part as an anchor part. In addition, the rod-like member may be formed in the uniform diameter or different diameter.

It is preferable that a diameter of the hollow part is formed to be such a low value as one not prohibiting a flowing-in of the adhesive agent so as not to decrease a mechanical strength of the connector such as a shearing force or a bending stress and the like.

The rod-like member having a branch pipe hole at a predetermined part in a longitudinal direction thereof can be set such that a diameter of the hollow part of the rod-like member can be changed across the branch pipe hole. The rod-like member having the substantial same lengths at its right and left segments across the branch pipe hole shows a substantial equal flow speed of the adhesive agent, so that the return-flows of the adhesive agent across the rod-like member occur concurrently and the diameters of the hollow parts may be the same from each other. However, in the case that the lengths of the rod-like member at the right and left segments of the branch pipe hole are different from each other, a diameter of the long segment of the rod-like member may be increased and a diameter of the short segment of the rod-like member may be reduced to cause a flow speed of the adhesive agent to be varied and the times of return-flow may be set to be the same from each other. The rod-like member may be formed of single item, although it may be divided into a plurality of segments, both ends of each of the segments may be threadably engaged and freely assembled from each other and a length of the rod-like member can be freely adjusted in compliance with a length of the connection hole of the structure members.

It is preferable that the projections or convex or concave parts formed at the outer surface of the rod-like member are set such that continuous projections or discontinuous projections are formed in random manner or formed in spiral shape, may act as buffer for the adhesive agent flowed out of the other end of the rod-like member, and it is formed into a shape for expanding an adhering area in which the adhesive agent is filled in a space between the outer surface of the rod-like member and a circumferential wall of the connection hole communicated with inter-structural members. In addition, one or a plurality of projections may be formed at the adhesive agent returning flow side of the rod-like member or the branch pipe in response to a working site or the type of adhesive agent (having a high viscosity). In addition, width or depth of the convex or concave parts such as spiral grooves may be changed in response to viscosity of the adhesive agent.

Although a shape of the adhesive agent flowing-out hole of at least one end of the rod-like member may be one of expanded shape, flat shape or concave shape, it is efficient that the shape is properly used in response to the application or the type of structural member. For example, the expanded material of wooden chips can be press fitted and inserted between the wooden members or complex materials, or in the case of concrete or stone material, the concave-shaped material can be inserted and fitted while crushing the convex portions in the hole, and further the material in which the flat connection hole is finished to a mirror surface is preferably used. In addition, if the end part of the rod-like member is formed with a guiding part such as a groove for guiding poured adhesive agent to the outer surface of the rod-like member, it is possible to guide the adhesive agent smoothly to a space between the surface of the rod-like member and the circumferential wall of the connection hole and further it is possible to improve a workability of pouring adhesive agent.

A shape of the end part of the rod-like member or a shape of the convex wall can be formed into a substantial semi-circle, a substantial circular column and a substantial triangle shape and the like. If the end part of the rod-like member or the convex wall is formed with a guiding groove for use in guiding adhesive agent, it is preferable that an eccentric flow of the adhesive agent can be prevented.

A shape of the end part of the rod-like member or a shape of the insertion hole for fixing member at the convex wall may be formed into a substantial semi-circle, a substantial circle, a substantial ellipse, a substantial square, a substantial triangle or polygons such as pentagon, hexagon and the like in response to a shape of the fixing member selected in reference to a size or a thickness of the structural member.

As the fixing member, an item having a sharp end such as a drift pin and the like or a metallic rod, or a complex product made of fibers having high mechanical strength such as carbon fiber or boron fiber and the like and synthetic resin can be used. A diameter of the fixing member is made substantially the same as or smaller than that of the insertion hole for fixing member substantially the same as or smaller than that of the insertion hole for fixing member so as to facilitate an insertion and fixing of the fixing member. The fixing member is fixed by the adhesive agent to enable its looseness to be eliminated and at the same time an adhering withstand force can be increased. If the outer circumferential surface of the fixing member is formed in flush with a plane, or formed with a spiral shape or formed with convex or concave portions in parallel with in a longitudinal direction, the adhesive agent flows in these convex or concave portions, the rod-like member and the fixing member can be fixed by the adhesive agent and then a more powerful connected structure can be attained. The projection or the flange at the end part of the rod-like member is made of material having a high bending stress such as metal or complex resin and the like, the projections or the flange preferably made may be fixed to the rod-like member by welding and the like or may be integrally formed with the rod-like member. It is satisfactory that a shape of the projection or the flange may be such a shape as one in which the rod-like member can be prevented from being pulled out of the connector when a strong tension force may act in an opposite direction to that of the forming part such as flange and the like.

The branch pipe is composed of a tubular item, formed by the same or different material quality of the rod-like member and engaged with the hollow part of the rod-like member in such a manner that the hollow part may be communicated with. A diameter of the branch pipe may be formed to be substantially the same as or slightly smaller than or larger than that of the rod-like member.

An engaging method may be carried out in such a manner that the branch pipe engaging part and the rod-like member engaging part may be formed with threaded holes or may be formed with fitting parts to engage with each other. Forming the branch pipe enables a smooth pouring of the adhesive agent into the connector in response to a working site. Although the branch pipe is pulled out of the connector after pouring the adhesive agent by releasing its engaged condition with the rod-like member, it may be left as it is in the case that a length of the branch pipe is short and no trouble may occur in the case of applying a plug.

Although it is preferable that the hollow part of the rod-like member or the branch pipe is finished to a mirror surface in order to reduce a flowing resistance of adhesive agent, the mirror surface machining may be eliminated if adhesive agent has a low viscosity.

As the adhesive agent, it is properly selected in response to the kind of structural members such as wooden member-to-wooden member, laminated wood-to-laminated wood, wooden material-to-laminated wood, wooden material or laminated wood-to-stone material, a concrete structure or a stone material-to-concrete structure and the like. As a practical example, organic adhesive agent such as epoxy resin system, polyurethane resin system and the like, and non-organic adhesive agent such as mortar and the like are used. In addition, it is preferable that pouring of the adhesive agent is carried out by double-stage pouring or pressurized pouring in the case of wooden material, laminated wood or concrete structure so as to prevent the adhesive agent from being absorbed, an amount of adhesive agent from being lacked and the adhering force from being reduced in response to the type of wooden material, laminated wood, and concrete. In addition, in the case that an adhering speed of the adhesive agent is slow or in the case that there is no charging amount of adhesive agent, it is preferable that the structural members are temporarily fixed by a supporting connector and the like until hardening of the adhesive agent meke the adhesion complete.

As the structural members, wooden materials or laminated wood such as rectangular columns, wooden materials such as plywood plate and the like, stone materials such as stone columns, or concrete columns, beams, walls and the like are used.

It is preferable that one or a plurality of connection holes formed to be communicated between the structural members are punched at an abutting surface between a plurality of structural members in compliance with a shape of the connector, their diameters are formed substantially the same as or slightly larger than a maximum diameter of the rod-like member of the connector and its depth is made at least the same as or slightly deeper than the length of the rod-like member of the connector stored so as to reduce a workability in punching operation or an amount of use of the adhesive agent. Forming of the connection holes may be made by a drill or the like at site or formed in advance at a factory through a pre-cut system and the like. The connection holes may be formed into a substantial vertical form, a slant form, a slant crossing form and a parallel form and the like against the abutting surface in compliance with a working site. It is preferable that if the abutting surface around the connection holes is coated with adhesive agent in advance, a structural strength can be further improved.

Upon completion of the pouring of the adhesive agent into the connection holes, the holes are covered by the plug or the buried wooden member to be in flush with the plane or repaired with putty and the like, thereby the finished surface can be made beautiful.

With such an arrangement as above, since the connector made of metal and the like is buried and fixed to the connection part between the structural members, it is possible to make a remarkable increasing of stresses against bending, tension, compression and shearing and the like. In addition, it is possible to change the type, diameter, length of connectors and the number of connectors in compliance with the strength required at the connection part. Since the connection holes are filled with the connector and the adhesive agent around it, it is possible to improve a mechanical strength against the bending stress and the like and further the connector is covered with the adhesive agent, so that it is possible to prevent the connector from being oxidized with dew and the like or from being weakened with salt disaster.

The connecting method is carried out such that connection holes or some cut portions are formed at the abutting surfaces of each of the structural members, the connector is inserted and fixed, the fixing member is inserted into or fitted to the insertion holes for fixing member, thereafter the adhesive agent is merely poured into the holes, so the working step can be quite simplified and the number of working steps can be reduced.

Since the complex connector having a large number of component parts is not used, it is possible to prevent the materials from being broken and lost due to wrong fitting of the connector.

In addition, the connector is buried in the wooden material to enable its inside part to be protected by the carbonized surface of the wooden material during fire, the connector can be prevented from being melted, a structural strength of the connector can be maintained, a falling of a building can be prevented and therefore its safety characteristic can be improved.

The flowing-out end of the rod-like member is provided with the insertion holes for fixing member, the fixing member is inserted into the holes in a crossing right angle manner to prevent the connector from being rotated or pulled out together with the branch pipe and at the same time rigidity of a building structure is of high strength, and in the case of instantaneous breakage, the connector is prevented from biting into the wooden material to keep its withstand force and therefore it is possible to improve its reliability and workability in operation.

Since the fixing member and the rod-like member are integrally solidified with adhesive agent through the insertion holes for fixing member, they are strongly connected even against an instantaneous external force of earthquake, breakage of the adhesive agent between the rod-like member and the connection holes can be prevented and then a strong withstand force can be applied. In addition, a part to be solidified with adhesive agent optionally and another part buried in the wooden material not influenced by adhering effect are formed in the fixing member, thereby it is possible to keep a mechanical withstand force at the part not influenced by the adhering effect after primary breakage of the adhesive agent. It is also possible to prevent the connector from being pulled out of it when the structural members are assembled and further to improve a complete characteristic of assembling work.

In addition, the connector can be simply used to furniture or fittings and the like. In addition, a mere pouring of the adhesive agent after drilling connection holes in the damaged buildings or the damaged furniture with a drill and the like and fixing the rod-like member with the fixing member enables a quite easy repairing to be attained.

Since the present invention is constructed as described above, it is possible to realize the connector and a method for connecting the building structures using the connector having the following superior effects.

(1) Since the rod-like member is fixed to the structural member with the fixing member, it is possible to keep the connected condition between the adhesive agent and the structural member due to holding of the rod-like member with the fixing member even if the building shakes upwards, downwards, rightwards or leftwards.

(2) Even if a building shakes widely due to earthquake and the like or a large striking force is applied to the building and the adhesion between the connector and the structural member is broken, it is possible to prevent falling and breakage of the building due to the fact that the fixing member inserted and fixed to the adhering part holds the rod-like member.

(3) Since the end part of the rod-like member has a flange, it is possible to get a strong connected structure together with the fixing member and further since the connector is inserted into and fixed to within the wooden member and the like and coated by the adhesive agent, it is possible to prevent salt damage or dew formation, as the result, it is possible to make a remarkable durability of the connecting structure without producing any corrosion and the like.

(4) Since the connector cannot be seen from outside, it is possible to make a joint coupler structure having a superior aesthetic appearance and further to increase an additive value of the building structure.

(5) During fire, the connector within the wooden member is protected by the carbonized film of the wood and no thermal deformation occurs, resulting in that the falling of the building can be prevented and an escaping time and the like can be assured. In addition, use of a plurality of connectors enables a progress of the damaged location to be restricted to a minimum and further safety characteristic can be remarkably improved.

(6) In the prior art building, in particular, in the wooden building, the connection part become thin by various process, resulting in that the connection part was weak against a tensile and compression stress and a bending stress, a shearing stress, and so it was necessary to make the structural members such as wooden members more thick or larger than a requisite size or to provide an auxiliary fitting so as to accommodate for it. However, in the present invention, the strength can be artificially controlled by changing the wall thickness or the shape of the rod-like member or the fixing member, a diameter, length and the number of the hollow part, so that it is possible to perform a process in according to a required strength of the connected part. In addition, the rectangular column having a large section or a beam having a large and long span which is superior in structural strength can be easily manufactured at site work by connected the commercially available rectangular column.

(7) Since it is possible to get the same rigidity and withstand force as those of one rigid member under a combination of the adhesive agent and the connector in reference to rigidity of the connected part, a high-storied building such as a three-storied building can be sufficiently constructed and further such effects as above can be attained by less number of connectors during work, resulting in that workability, labor saving and rationalization during work can be remarkably improved.

(8) The method for connecting the building structures is carried out such that the connector is inserted into the connection holes and fixed to the insertion and fixing part with the fixing member, so that when the adhesive agent pouring gun is pulled out, the connector may not be pulled out, in resulting that the workability can be quite increased. In addition, since the simple work is carried out, the working period can be substantially shortened.

(9) Since the connected parts in the furniture, playing goods, toys and the like are not destroyed under their strong connected structures, it is possible to make a remarkable increasing of durability.

(10) When the buildings or furniture or fittings are to be repaired, the connection holes are opened with a drill and a mere installing of the connector enables an easy connection of the parts to be attained, in resulting that a strong repairing can be carried out.

BRIEF DESCRIPTION OF THE DRAWINGS

FIGS. 3(a) through 3(e) are front elevational views for showing a substantial part of the adhesive agent flowing-out hole so as to illustrate examples of application of the rod-like member of the connector of the first preferred embodiment of the present invention.

FIGS. 4(a) through 4(e) are side elevational views for showing a substantial part so as to illustrate examples of application of the insertion hole for fixing member of the connector of the first preferred embodiment of the present invention.

DESCRIPTION OF THE PREFERRED EMBODIMENTS OF THE INVENTION

Figure 1:
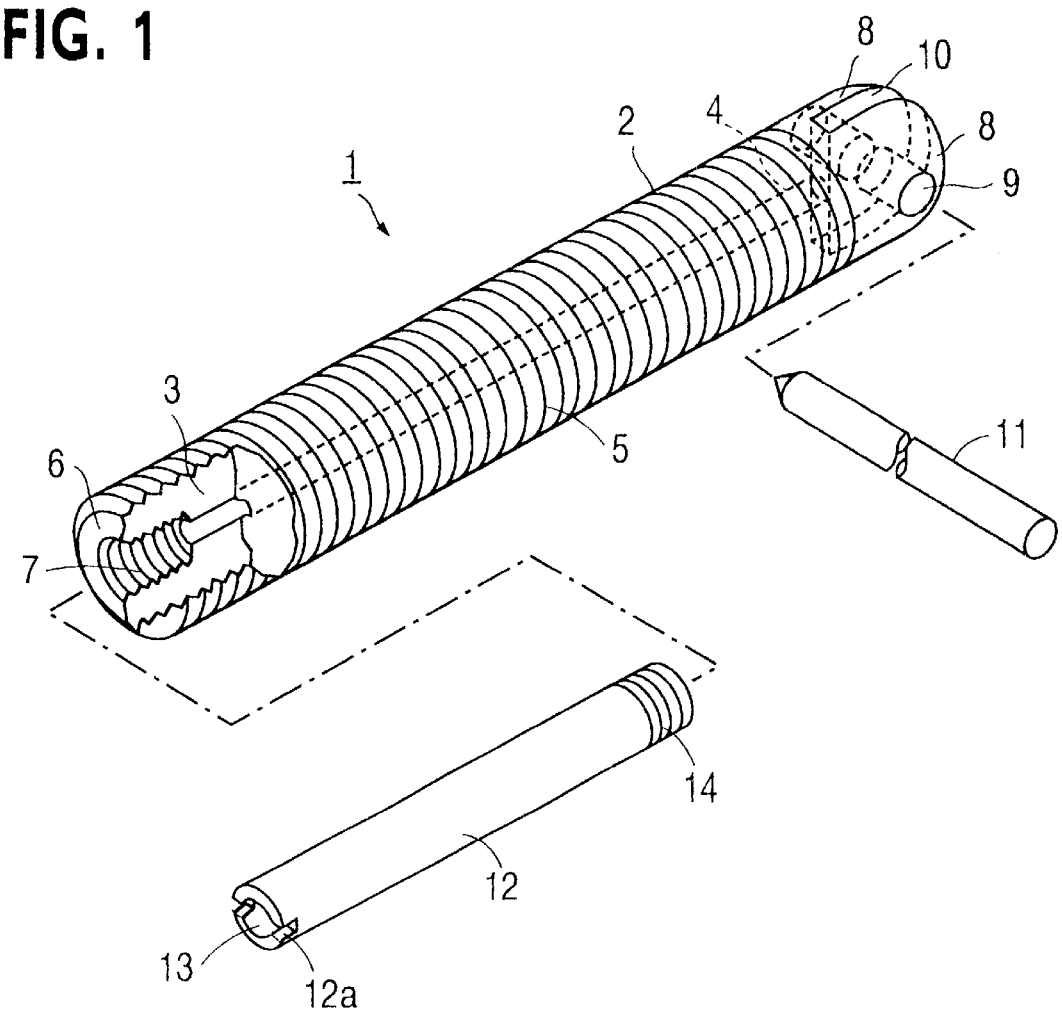
FIG. 1 is a perspective view partly broken-away for showing the connector of the first preferred embodiment of the present invention.

Referring now to the drawings, some preferred embodiments of the present invention will be described as follows.
Preferred Embodiment 1

Figure 2A:
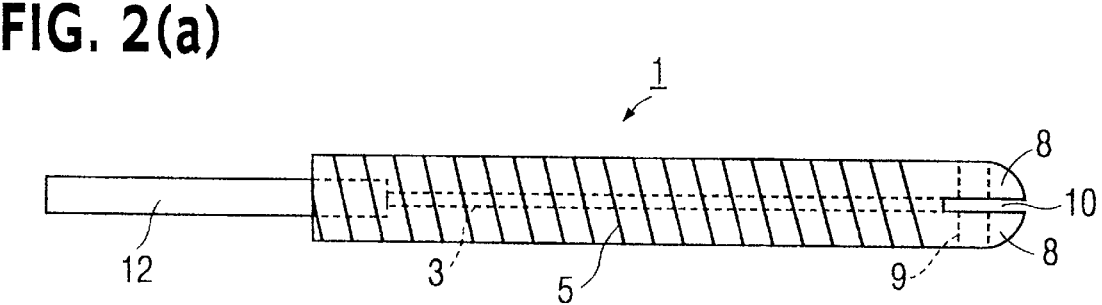
FIG. 2(a) is a side elevational view for showing the connector of the first preferred embodiment of the present invention.
Figure 2B:
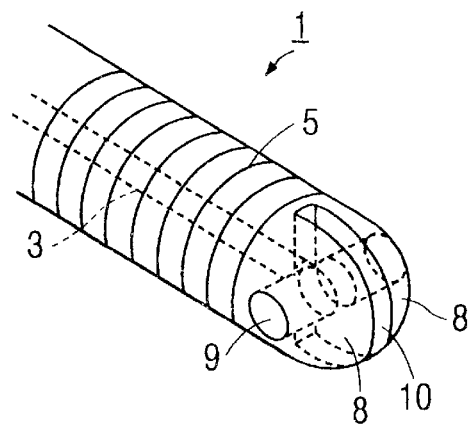
FIG. 2(b) is a perspective view for showing a substantial part of an adhesive agent flowing-out hole in the connector of the first preferred embodiment of the present invention.

FIG. 1 is a perspective view partly broken-away for showing the connector of the first preferred embodiment of the present invention, FIG. 2(a) is a side elevational view of FIG. 1, FIG. 2(b) is a perspective view for showing a substantial part of an adhesive agent flowing-out hole, FIG. 3 is a front elevational view for showing a substantial part of the adhesive agent flowing-out hole so as to illustrate examples of application of the rod-like member of the connector, and FIG. 4 is a side elevational view for showing a substantial part so as to illustrate examples of application of the insertion hole for fixing member of the connector.

1 denotes a metallic connector of the first preferred embodiment; 2 a metallic rod-like member; 3 a hollow part of the rod like member 2 formed at a substantial central part in a longitudinal direction of the rod-like member 2 and opened at both ends for flowing adhesive agent; 4 an adhesive agent flowing-out hole opened at one end of the hollow part 3; 5 convex or concave portions spiral formed on the surface of the rod-like member 2; 6 an opening part of the hollow part 3 of the rod-like member 2; 7 a branch pipe engaging part spiral formed at the opening part 6; 8, 8 convex walls symmetrically formed around the hollow part 3 at the adhesive agent flowing-out hole 4 of the rod-like member 2; 9 the insertion holes for fixing member formed at central portions of the convex walls 8, 8; 10 an adhesive agent guiding groove formed between the convex walls 8, 8; 11 a fixing member composed of a drift pin or a metallic rod-like item or a complex resin item to be inserted and fixed into insertion hole 9 for the fixing member; 12 a branch pipe made of synthetic resin or metal engaged with the branch pipe engaging part 7 through a threaded fitting and the like; 12a engaging grooves formed at the end part of the branch pipe 12 for a screw driver; 13 a branch pipe hollow part communicated with the hollow part 3 of the rod-like member 2; and 14 an engaging part formed spiral at the end part of the branch pipe 12 and threadably engaged with the branch pipe engaging part 7 of the rod-like member 2.

In FIG. 3(a), a front elevational shape of the rod-like member 2 is formed substantially into a circular shape so as to facilitate an insertion of the rod-like member into a rough-cut connection hole formed in a wooden member and the like. FIG. 3(b) shows that a front elevational shape of the rod-like member 2 is formed into a substantial ellipse shape so as to facilitate a connection between a foundation and a column, a dispersion of external force, its reinforcement and a prevention of rotation of a member. FIGS. 3(c) to 3(e) show that the rod-like member is formed into a substantial square or rectangular, a substantial hexagon shape, and a substantial triangle shape and these shapes are suitable for preventing a rotation between the members and for connecting them from each other. Although not shown, the convex wall portions 8 may be formed into an inverse frustum of circular cone in which their ends are expanded around the hollow part. Since the connector can be inserted into the structures such as concretes or stone materials when they are connected while some projections in the connection holes are being crushed, it is useful in operation.

In FIG. 4, the shape of the insertion hole 9 for the fixing member is properly classified in response to a shape or a size of the connected items such as structural members, e.g., a substantial semi-circular shape as shown in FIG. 4(a), a substantial circular shape as shown in FIG. 4(b), a substantial semi-ellipse shape as shown in FIG. 4(c), a substantial square shape as shown in FIG. 4(d) and a substantial triangle or polygonal shape as shown in FIG. 4(e), respectively.

A method for connecting the structural members and a connected structure between the structural members will be described as follows in reference to the connector of the first preferred embodiment constructed as described above.
Example of Connection 1

Figure 5:
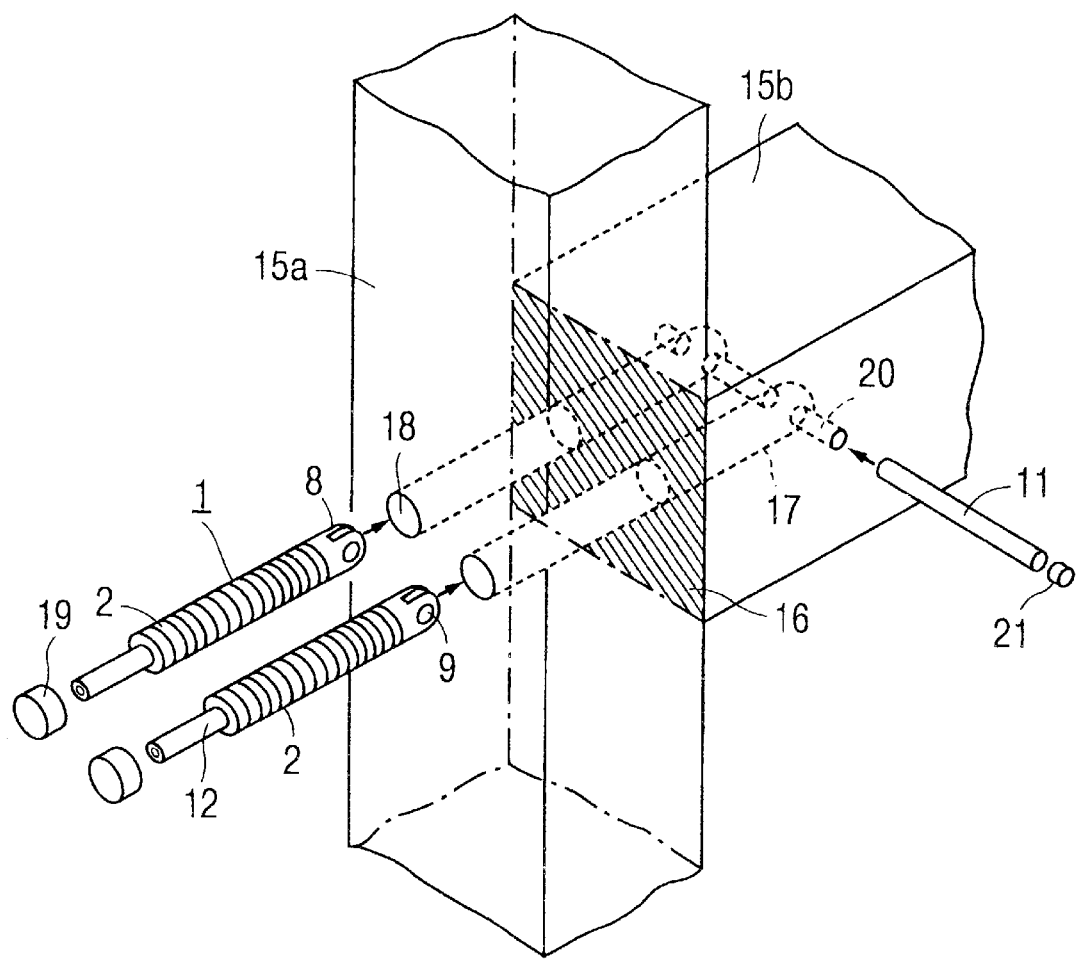
FIG. 5 is a perspective view for showing a state in which an independent column and a lateral beam are jointly connected by applying the connector of the first preferred embodiment of the present invention.
Figure 6A:
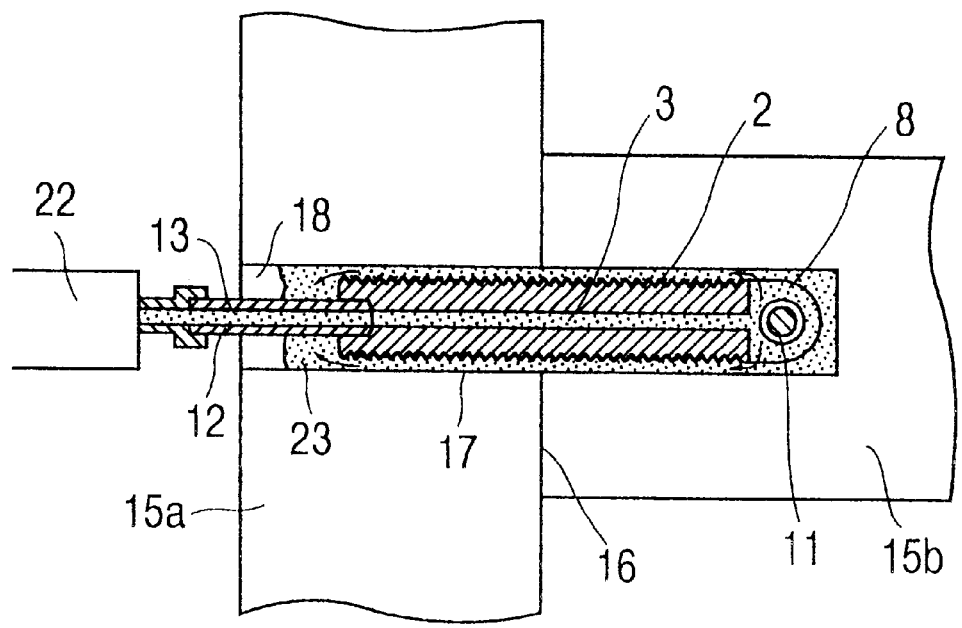
FIG. 6(a) is a side elevational view in section for showing a substantial part so as to illustrate a state in which the joint connection work is carried out by using the connector of the first preferred embodiment of the present invention.
Figure 6B:
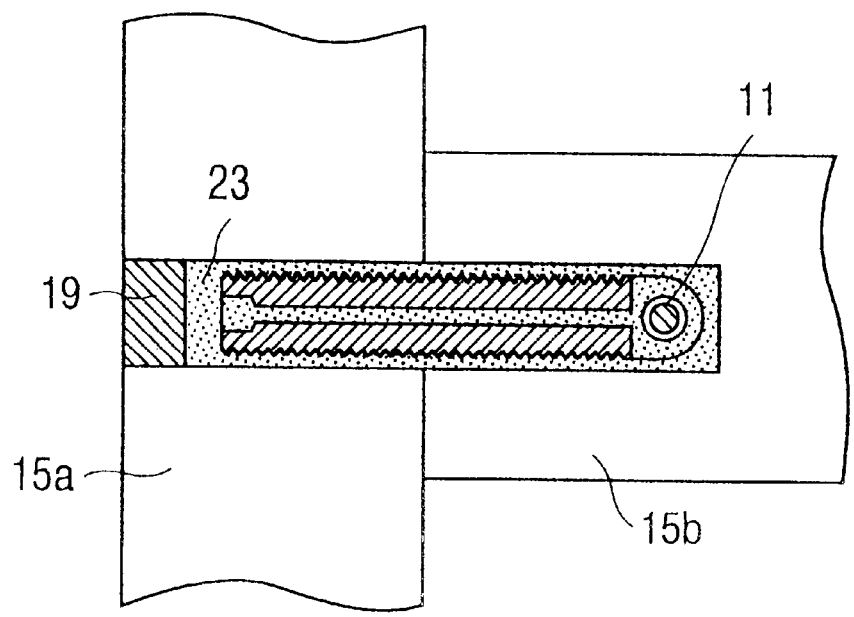
FIG. 6(b) is a side elevational view in section for showing a substantial part so as to illustrate a state after joint connection work by using the connector of the first preferred embodiment of the present invention.

FIG. 5 is a perspective view for showing a state in which an independent column and a lateral beam are jointly connected by applying the connector of the first preferred embodiment of the present invention, FIG. 6(a) is a side elevational view in section for showing a substantial part so as to illustrate a state in which the joint connection work is carried out, and FIG. 6(b) is a side elevational view in section for showing a substantial part so as to illustrate a state after joint connection work. 1 denotes the connector of the first preferred embodiment; 2 a rod-like member; 8 a convex wall; 9 an insertion hole for the fixing member; 11 a fixing member; 15a an independent column; 15b a lateral beam; 16 a joint connecting surface abutting the independent column 15a and the lateral beam 15b; 17 connection holes formed to be communicated with the independent column 15a and the lateral beam 15b through the joint connecting surface 16; 18 hole openings of the connection holes 17; 19 plugs made of wood or synthetic resin covering the hole openings 18 of the connection holes 17 after joint connection and making in flush with the column surface; 20 an insertion and fixing part for inserting and fixing the fixing member 11 formed by punching the lateral beam 15b at a position of the insertion hole 9 for the fixing member of the rod-like member 2 inserted into and fixed to the connection hole 17; 21 a plug for insertion and fixing part so as to prevent the adhesive agent from being flowed out after the fixing member 11 is inserted and fixed; 22 an adhesive agent pouring gun; and 23 an adhesive agent poured from the branch pipe 12, passed through the hollow part 3 of the rod-like member 2 and the adhesive agent guiding groove 10 and filled in the connection hole 17 until its flowing-out can be visually confirmed at the hole opening 18 of the connection hole 17 while fulfilling the connection hole 17.

A method for connecting structural members is carried out such that at first the connection holes 17 having a slightly larger diameter than that of the connector 1 and having such a depth as one in which a central part of the rod-like member 2 of the connector 1 comes to the joint connecting surface 16 are drilled to be communicated with the connecting surface between the independent column 15a and the lateral beam 15b by a drill and then the hole for the insertion and fixing part 11 is drilled by a drill at the inserting position of the insertion hole 20 for the fixing member of the connector 1 from the side surface of the lateral beam 15b. The connection holes 17 and the hole for the insertion and fixing part 11 may be drilled in advance at a factory and the like because its working period can be shortened. The connectors 1 are inserted into the connection holes 17 and then the fixing member 11 such as a drift pin and the like is inserted into and fixed to the insertion hole 9 for the fixing member formed at the convex walls 8 of the rod-like member 2. Then, the plug 21 for the insertion and fixing part is inserted into the insertion and fixing part 20 of the lateral beam 15b so as to become in flush with the surface of the lateral beam 15b. The independent column 15a and the lateral beam 15b are temporarily fixed by a supporting connector. The adhesive agent pouring gun 22 is inserted into and, fixed to the branch pipe 12. Then, the adhesive agent 23 is poured through the branch pipe hollow part 13 and the hollow part 3 of the connector 1 until the adhesive agent 23 returned back to the hole opening 18 of the connection hole 17 while fulfilling the connection hole 17 can be visually confirmed. As shown in FIG. 6(a), the adhesive agent 23 passes from the branch pipe hollow part 13 through the hollow part 3 as indicated by an arrow and fills from the adhesive agent guiding groove 10 and a space between the convex or concave portions 5 at the surface of the rod-like member 2 and the circumferential wall of the connection hole 17. In this case, a channeling or a short pass of the adhesive agent 23 is prevented under a buffering effect of the convex or concave portions 5 at the surface of the rod-like member 2 and the adhesive agent 23 is filled in the clearance with a scarce leakage of it.

In addition, continuation of pouring of the adhesive agent 23 enables a visual confirmation of the adhesive agent 23 of returning-back while fulfilling a clearance between the outer surface of the branch pipe 12 and the connection hole 17, so that it is possible to prevent any filling spots. Upon visual confirmation of the adhesive agent 23 in the hole opening 18 of the connection hole 17, the extremity end of the screw driver is engaged with the engaging groove 12a of the branch pipe 12 to cause the branch pipe 12 to be rotated half so as to release its engaged state with the rod-like member 2. Since the fixing member 11 is installed in the insertion hole 9 for the fixing member of the rod-like member 2, the rod-like member 2 is not rotated or not pulled out. Then, the plug 19 is passed through the hole opening 18 of the connection hole 17 and covers it in flush with the surface of the independent column 15a. If the plug 19 is made of the same material quality as that of the independent column 15a, it can be integrally made with the independent column 15a without any irregular feeling when it is covered in flush with the column. After solidifying the adhesive agent, the support connector is removed.

As described above, in accordance with the present preferred embodiment, since the fixing member is inserted into and fixed to the insertion hole for the fixing member of the connector from the surface of the structural member and then the connector is fixed in the connection hole, the adhesive agent pouring work can be performed quite easily. In addition, even if the building is oscillated due to earthquake and the like and an external force more than an adhering force of the adhesive agent is applied, it is possible to reduce influence of the external force against the adhesive agent, prevent the adhesive agent from being broken and increase safety characteristic quite well due to the fact that the connector is fixed to the strucutral member with the fixing member.

Preferred Embodiment 2

Figure 7:
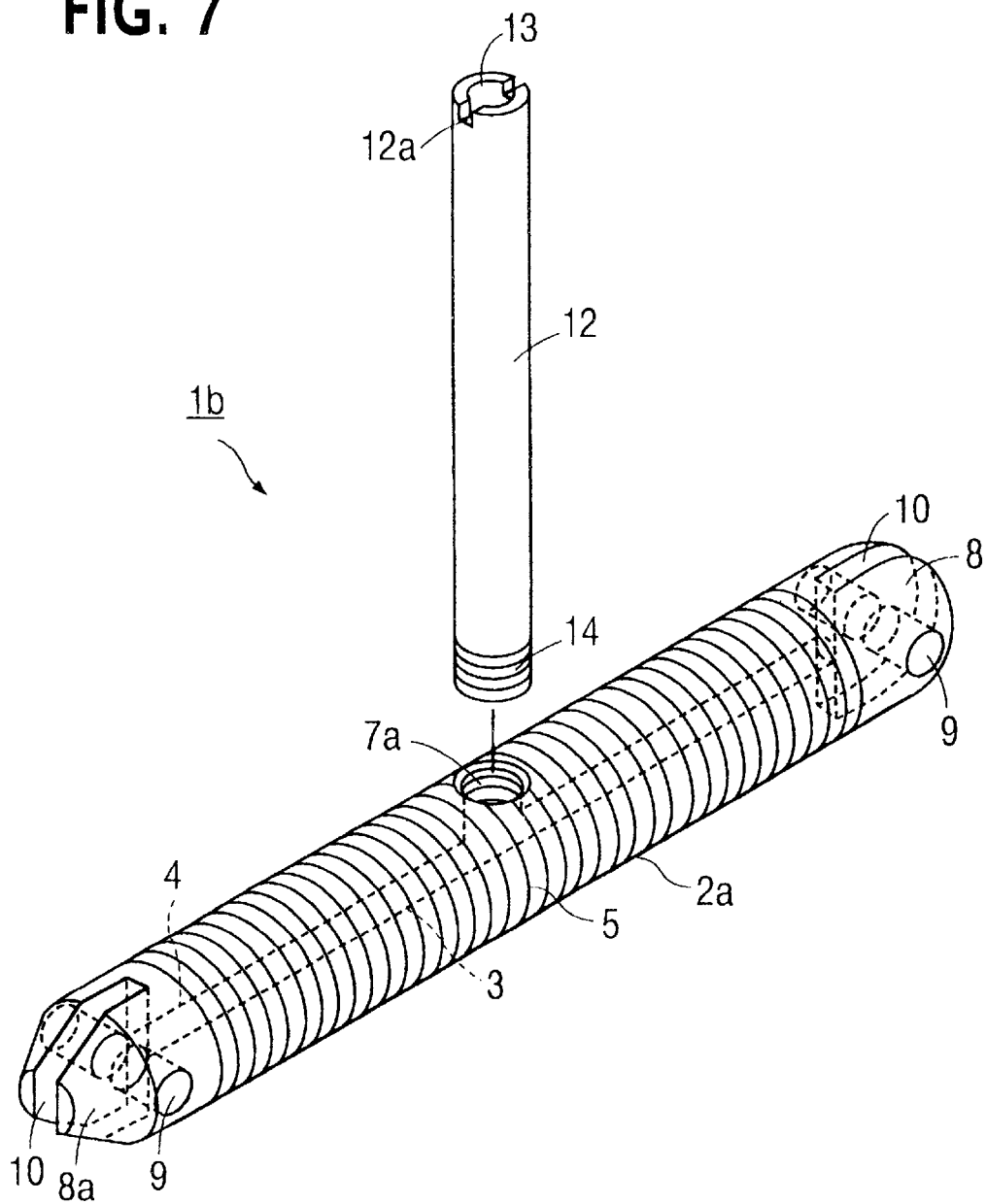
FIG. 7 is a perspective view partly broken away for showing the connector of the second preferred embodiment of the present invention.

FIG. 7 is a perspective view for showing the connector in the second preferred embodiment of the present invention.

3 denotes a hollow part; 4 an adhesive agent flowing-out hole part; 5 convex or concave portions; 8 a convex wall part; 9 a fixing member insertion and fixing hole; 10 an adhesive agent guiding groove; 12 a branch pipe; 12a an engaging groove; 13 a branch pipe hollow part; 14 an engaging part. These members are similar to those of the preferred embodiment 1, same reference numerals are applied and their description will be eliminated.

1a denotes the metallic connector of the second preferred embodiment in which the branch pipe is engaged with the branch pipe engaging part 7a formed at a predetermined part in a longitudinal direction of the rod-like member 2a, and there are provided adhesive agent flowing-out holes 4 at both ends; 2a a metallic rod-like member of hollow round bar; 7a a branch pipe engaging part formed at a substantial central part of the rod-like member 2a in a longitudinal direction communicated from the outer circumferential surface of it to the hollow part 3 and for fixing the branch pipe 12 or removably engaging with it; and 8a a convex wall part of substantial frustum of circular cone formed at the end part opposite to the convex wall part 8 at the end part of the rod-like member 2a, wherein the convex wall part 8a may be formed in the same shape as that of the expanded convex wall part 8.

Example of Connection 2

Figure 8:
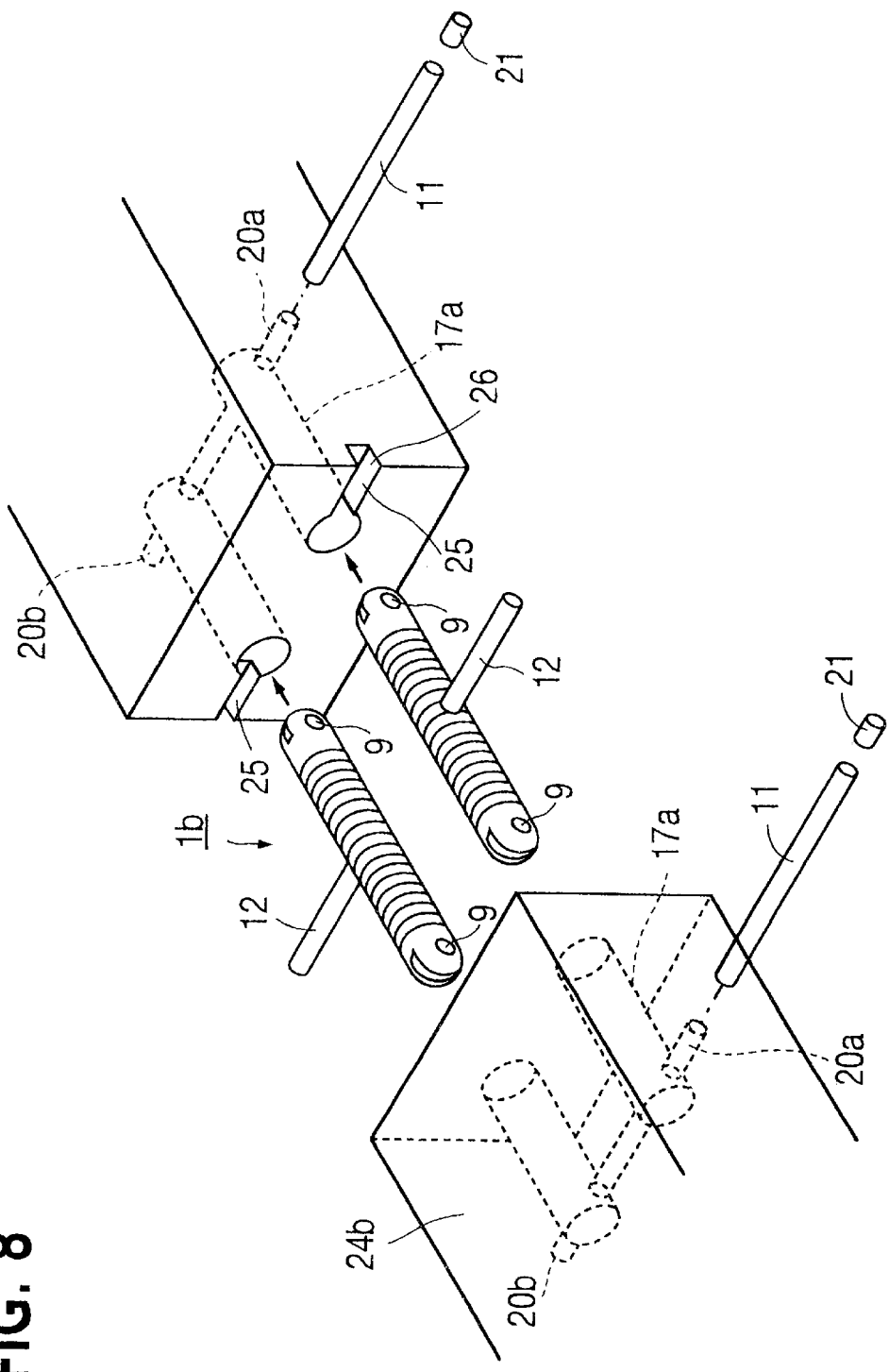
FIG. 8 is a perspective view for showing a state in which a coupler connection work is carried out by using the connector of the second preferred embodiment of the present invention.
Figure 9:
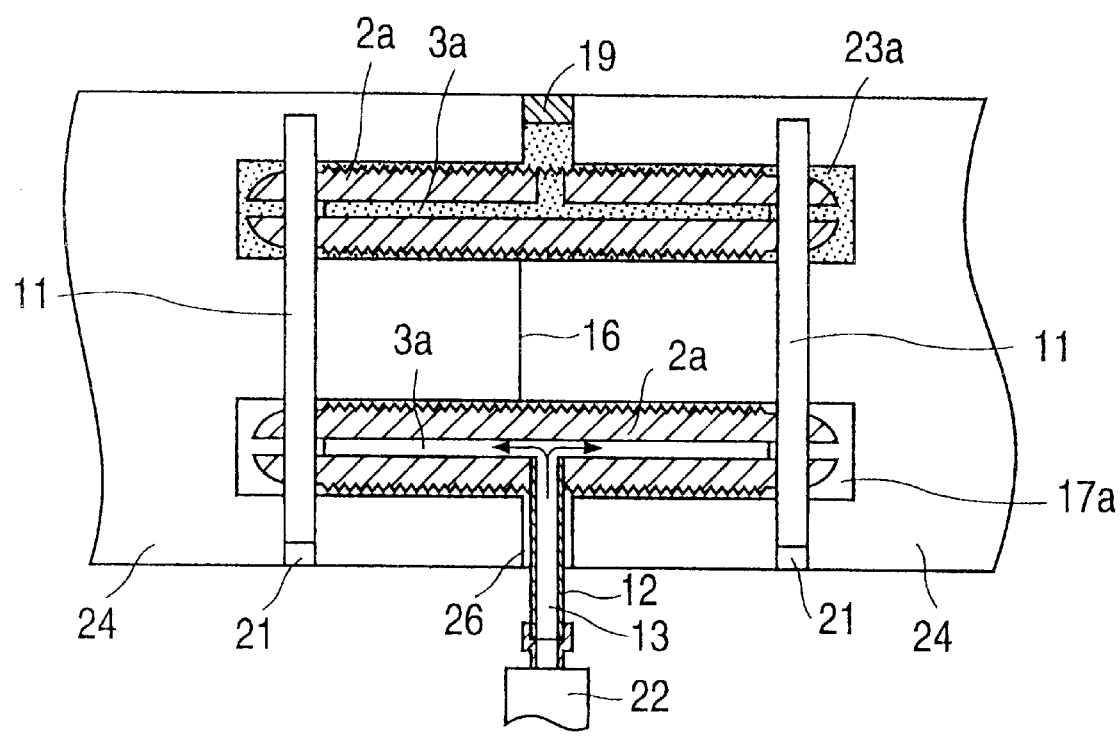
FIG. 9 is a side elevational view in section for showing a central substantial part of the connected part so as to illustrate a coupler connected state and a connection work by using the connector of the second preferred embodiment of the present invention.

FIG. 8 is a perspective view for showing a state of work of the connector for the beam or the column by using the connector of the second preferred embodiment of the present invention. FIG. 9 is a side elevational view in section for showing a substantial central part of the connected portion so as to illustrate the joint connected state and the connection work.

17a denotes a connection hole formed at the connection surface; 19a a wooden or synthetic resin plug forming a lid for the opening 26 of the branch pipe installing groove 25 after joint connection and making in flush with the surface of the beam; 24a, 24b beam members for performing joint connection; 25 a branch pipe installing groove part and formed at the abutting surface of the connection hole 17a of the beam member 24a or 24b for installing the branch pipe 12; 26 an opening for the branch pipe installing groove 25; 22 an adhesive agent pouring gun; and 23a an adhesive agent poured from the branch pipe 12 and filled until its returning-back flow can be visually confirmed at the opening 26 of the branch pipe installing groove 25 while filling the connecting hole 17a through the hollow part 3a of the rod-like member 2a.

The method for connecting the members of the present preferred embodiment is at first carried out such that connection holes 17a having a diameter slightly larger than that of the connector 1a and having a depth to cause the central part of the connector 1a in a longitudinal direction to reach the connecting surface 16 between each of the beam members 24a and 24b are drilled by a drill while being communicated with the abutting surface between the beam members 24a and 24b to be joint connected. Then, the branch pipe installing grooves 25, for use in installing the branch pipes 12 are formed at the abutting surface 16 of one communicating connection hole 17a. Then, the insertion and fixing parts 20 for the fixing member 11 are formed by a drill into a hole having a bottom part from the outer surface of one of the beam members 24a, 24b at the position of the fixing member insertion and fixing hole 9 of the connector 1a. The connection hole 17a, or the branch pipe installing groove 25 and the insertion and fixing part 20 of the fixing member 11 may be formed in advance at a factory. Then, the rod-like member 2a having the branch pipe 12 engaged with it is inserted into the connection hole 17a communicated with the abutting surface 16 so as to cause the beam members 24a and 24b to be abutted to each other. Then, the fixing member 11 is inserted into the insertion and fixing part 20, inserted and fixed to the fixing member insertion and fixing hole 9 of the connector 1b and the fixing member 11 is fixed. Then, the insertion and fixing plug 21 is buried in flush with the insertion and fixing part 20a.

Then, the adhesive agent pouring gun 22 is installed and set at the opening of the branch pipe 12, the adhesive agent 23a passes through the hollow part 3a of the connector 1b, fills the connection hole 17a, and further the adhesive agent is filled in the connection hole 17a until its visual confirmation of returning-back flow to the opening 26 of the branch pipe installing groove 25. As shown in FIG. 9, the charging of the adhesive agent 23a is carried out such that the adhesive agent is poured from the branch pipe hollow part 13, the adhesive agent passes through the hollow part 3a, and further fills the clearance between the fixing member 11 or the fixing member insertion and fixing hole 9 or the convex or concave portions 5 at the surface of the rod-like member 2a and the circumferential wall of the connection hole 17a in the same manner as that of the preferred embodiment 1.

As described above, in accordance with the present preferred embodiment, it is possible to realize the connector in which the connected structure having a superior connecting strength can be carried out by a simple work and it is connected strongly by the connector buried in the connection hole and the adhesive agent filled without any spot, resulting in that it is remarkably superior against a bending strength and at the same time the fixing member may be strongly adhered and fixed by the adhesive agent around it, resulting in that the joint structures and the method for joint connection in which the compression strength and the tension strength are remarkably reinforced can be realized.

Preferred Embodiment 3

Figure 10A:
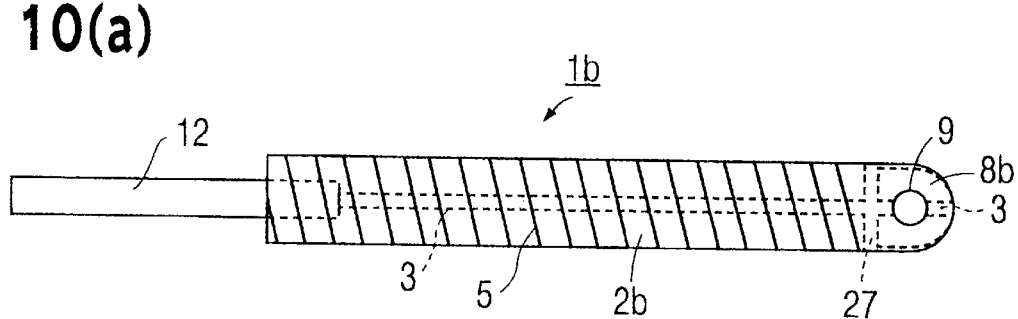
FIG. 10(a) is a side elevational view for showing the connector of the third preferred embodiment of the present invention.
Figure 10B:
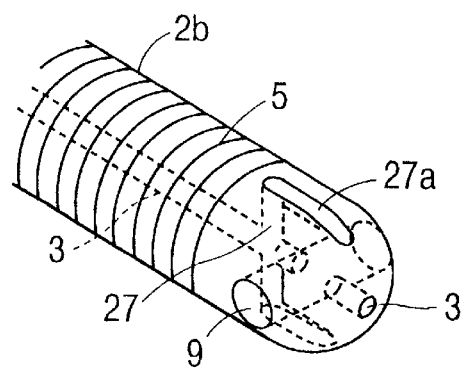
FIG. 10(b) is a perspective view for showing a substantial part at an adhesive agent flowing-out hole of the connector of the third preferred embodiment of the present invention.

FIG. 10(a) is a side elevational view for showing the connector of the third preferred embodiment of the present invention. FIG. 10(b) is a perspective view for showing a substantial part of the adhesive agent flowing-out hole of the connector of the third preferred embodiment of the present invention.

1b denotes the connector of the third preferred embodiment; 2b a rod-like member; 3 a hollow part formed from one end of the rod-like member 2b to be communicated with the other end thereof; 8b an expanded part of the adhesive agent flowing-out part of the rod-like member 2b; 9 a fixing member insertion and fixing hole formed at the expanded part 8b; 12 a branch pipe fixed to or removably engaged with one end of the rod-like member 2b; 27 an adhesive agent flowing-out hole communicated with the hollow part 3, formed to be crossed with the hollow part 3 or slantly crossed toward the top part of the expanded part 8b; and 27a an adhesive agent flowing-out groove formed from the opening of the adhesive agent flowing-out hole 27 toward the end part thereof.

Since the present invention is constructed as described above, the connector of the third preferred embodiment enables the adhesive agent to be filled in the fixing member insertion and fixing hole or around the fixing member and further it is possible to get the powerful connected structure having no breakage of adhesive agent superior against a mechanical strength and against the shaking of earthquake.

In addition, since the adhesive agent flowing-out groove is formed, the smooth pouring of the adhesive agent can be carried out without being clogged at the adhesive agent flowing-out hole even if there are some wooden chips in the connection hole and the like.

Preferred Embodiment 4

Figure 11:
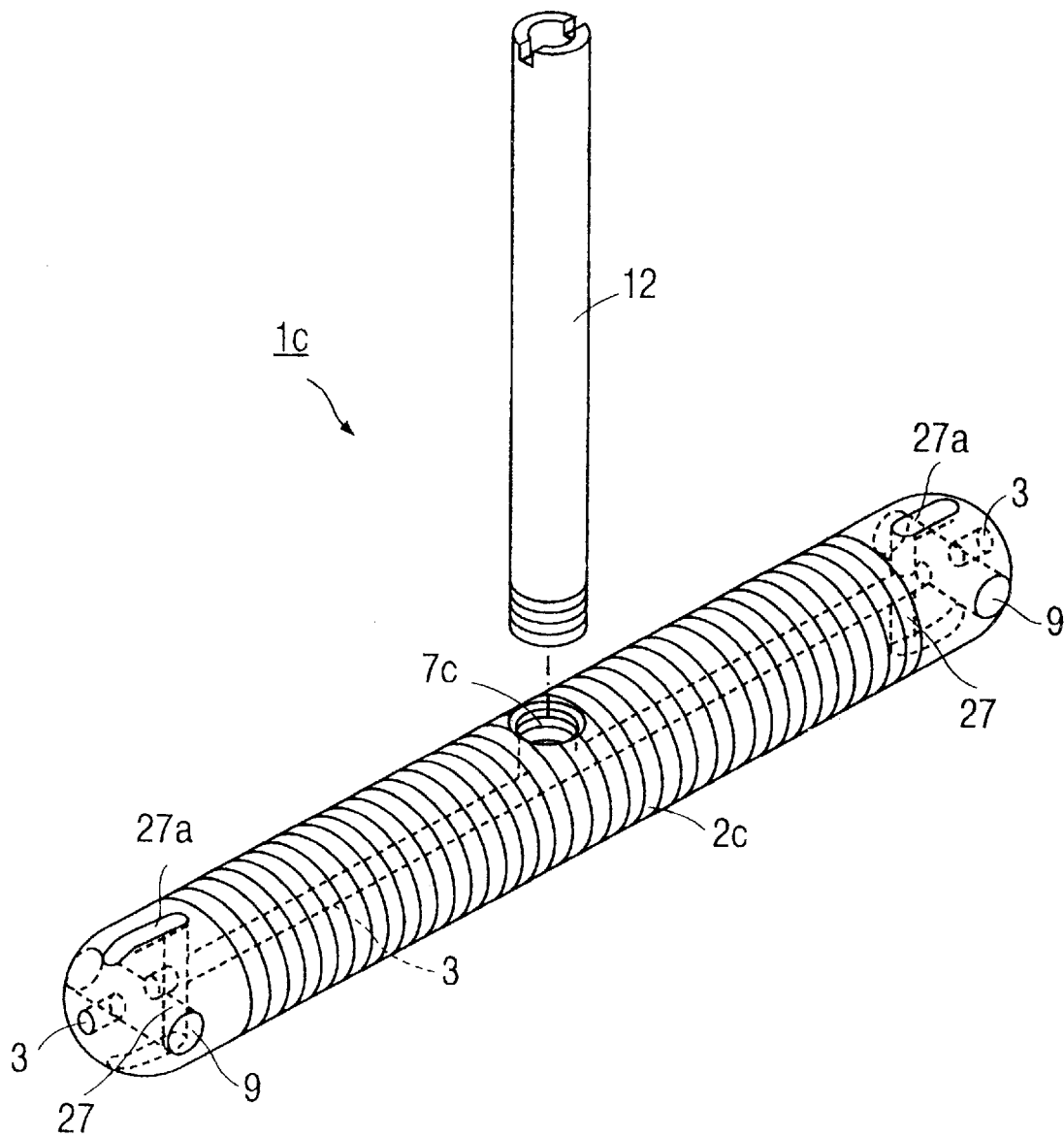
FIG. 11 is a perspective view for showing the connector of the fourth preferred embodiment of the present invention.

FIG. 11 is a perspective view for showing the connector of the fourth preferred embodiment of the present invention.

Major different points of this preferred embodiment from the connector of the third preferred embodiment shown in FIG. 10 consist in the facts that the connector 1c of the fourth preferred embodiment has adhesive agent flowing-out holes 27 at both ends and the branch pipe engaging part 7a for flowing the adhesive agent is formed at the central part of the rod-like member 2c.

Since the present invention is constructed as described above, it is possible to realize the quite strong coupler structure in accordance with the connector of the fourth preferred embodiment.

Preferred Embodiment 5

Figure 12:
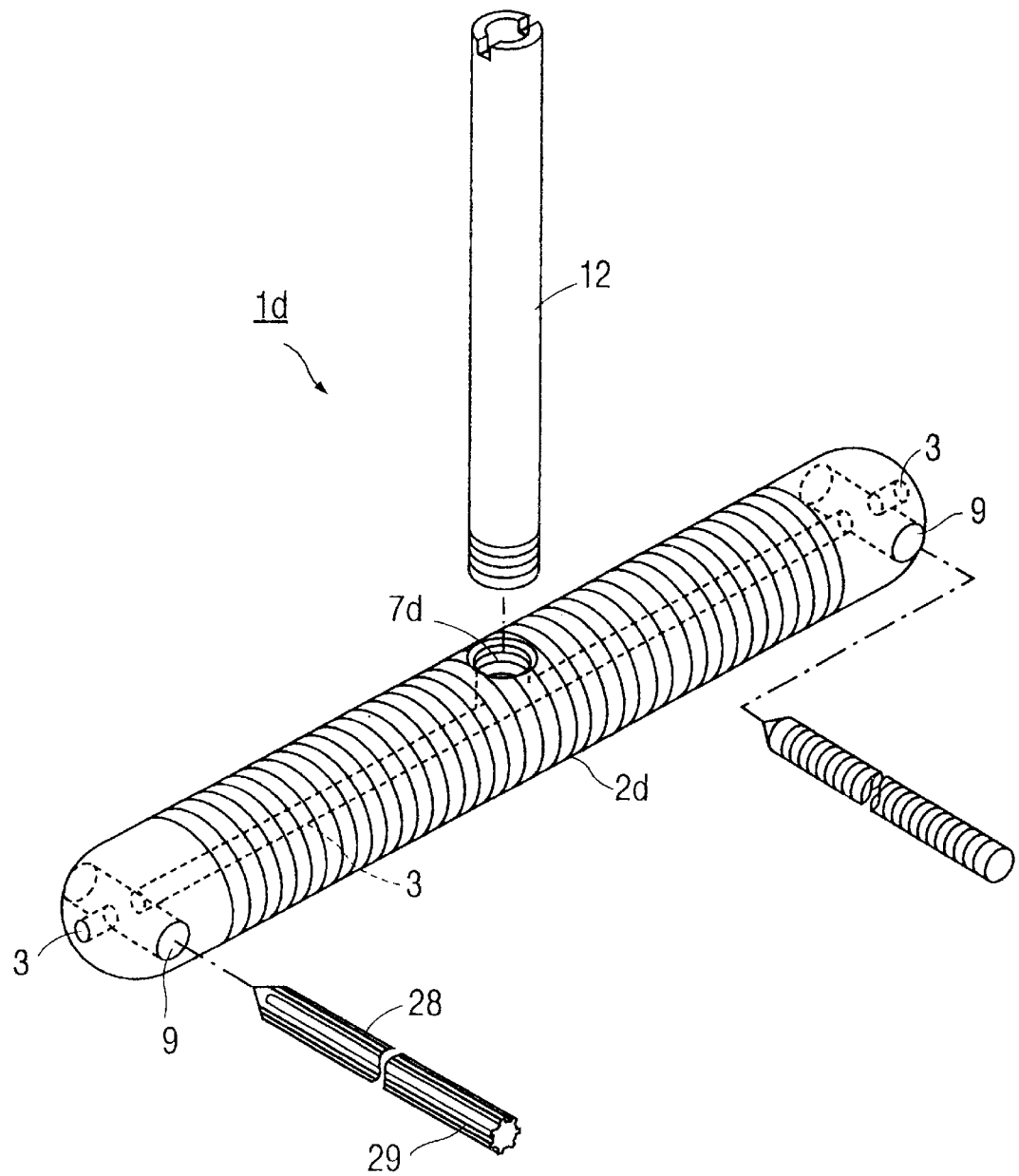
FIG. 12 is a perspective view for showing the connector of the fifth preferred embodiment of the present invention.

FIG. 12 is a perspective view for showing the connector of the fifth preferred embodiment of the present invention.

Some different points of this embodiment from the connector of the fourth preferred embodiment shown in FIG. 1 consist in the facts that the connector 1d of the fifth preferred embodiment has no adhesive agent flowing-out hole 27a formed at the rod-like member 2d to be crossed at a right angle with the hollow part 3, and the surface of the fixing member 28 is formed with the adhesive agent flowing-out convex or concave portions 28a.

Since the present invention is constructed as above, according to the connector of the fifth preferred embodiment, it has no adhesive agent flowing-out hole communicated to be crossed at a right angle with the hollow part 3, resulting in that the connector can be easily manufactured, can have a high yield and it can be manufactured at a high productivity.

The fixing member and the connector can be strongly connected with the adhesive agent flowing in the convex or concave portions of the fixing member and then a strength of the connected structure can be increased.

In addition, even if the diameter of the fixing member is made substantially the same diameter as that of the fixing member insertion and fixing hole, the adhesive agent can be efficiently filled by the convex or concave grooves.

Preferred Embodiment 6

Figure 13:
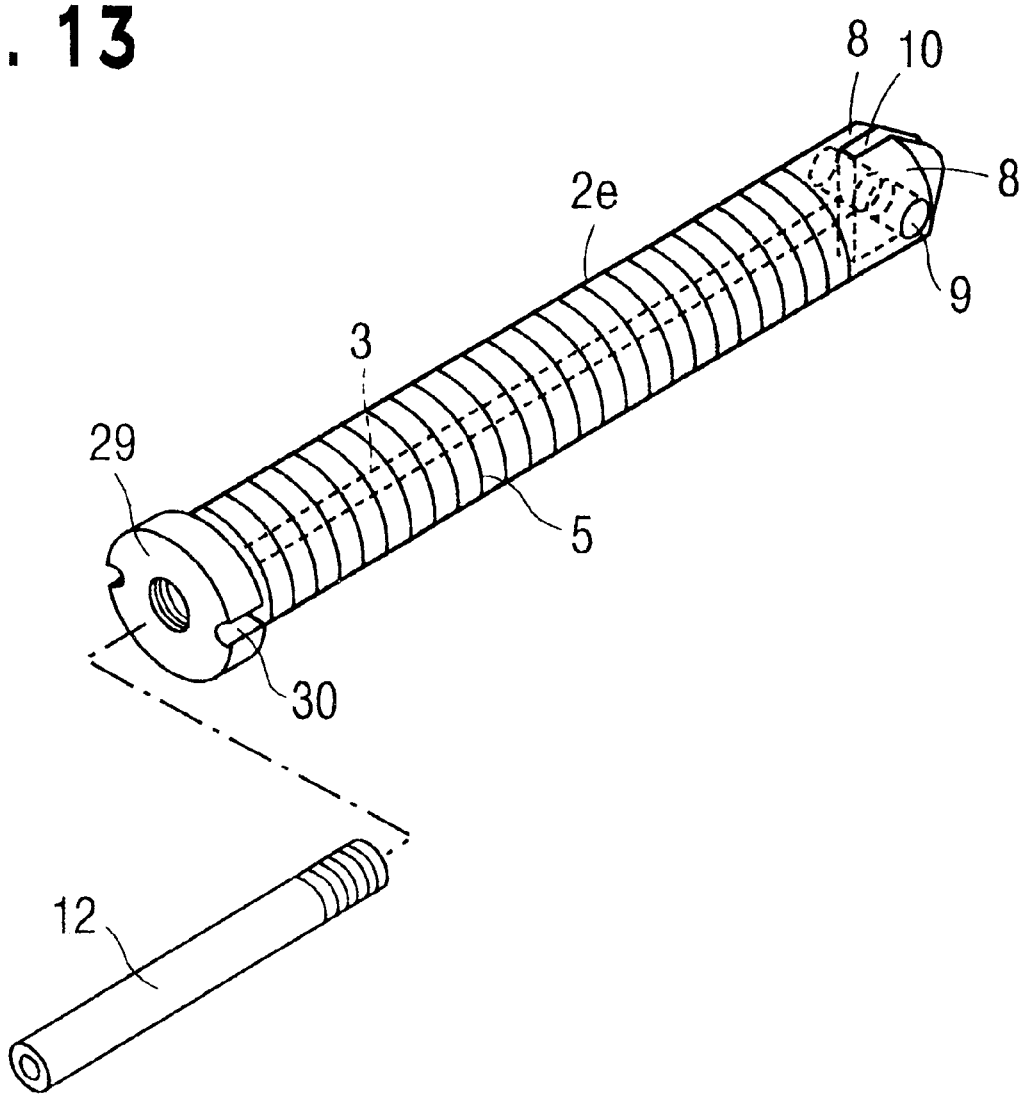
FIG. 13 is a perspective view for showing a substantial part of the connector of the sixth preferred embodiment of the present invention.

FIG. 13 is a perspective view for showing a substantial part of the connector of the sixth preferred embodiment of the present invention.

Some points differing from the connector of the first preferred embodiment shown in FIG. 2 consist in the facts that the connector 1e of the sixth preferred embodiment has the flange 29 of synthetic resin or metal at the adhesive agent flowing-in end 6 of the rod-like member 2e, and there is formed a recess 30 forming the adhesive agent returning-flow passage and indicating the direction of the insertion hole for fixing member at the outer circumferential surface of the flange 29.

Since the connector of the present preferred embodiment is constructed as described above, the position of the insertion hole for fixing member for the rod-like member is displayed at the recess of the flange part, resulting in that it can be quite easily inserted and fixed the fixing member after the rod-like member is installed in the structural member and so a workability in the insertion and fixing of the fixing member can be improved. In the case of the present preferred embodiment, it is necessary that the connection hole of the structural member is formed wide only by a diameter of the flange. In addition, the flange may be inserted into the branch pipe and fixed to it and the flange may be concurrently pulled out when the branch pipe is removed. In addition, in place of the flange, one or a plurality of projections may be formed.

Example of Connection 3

Figure 14:
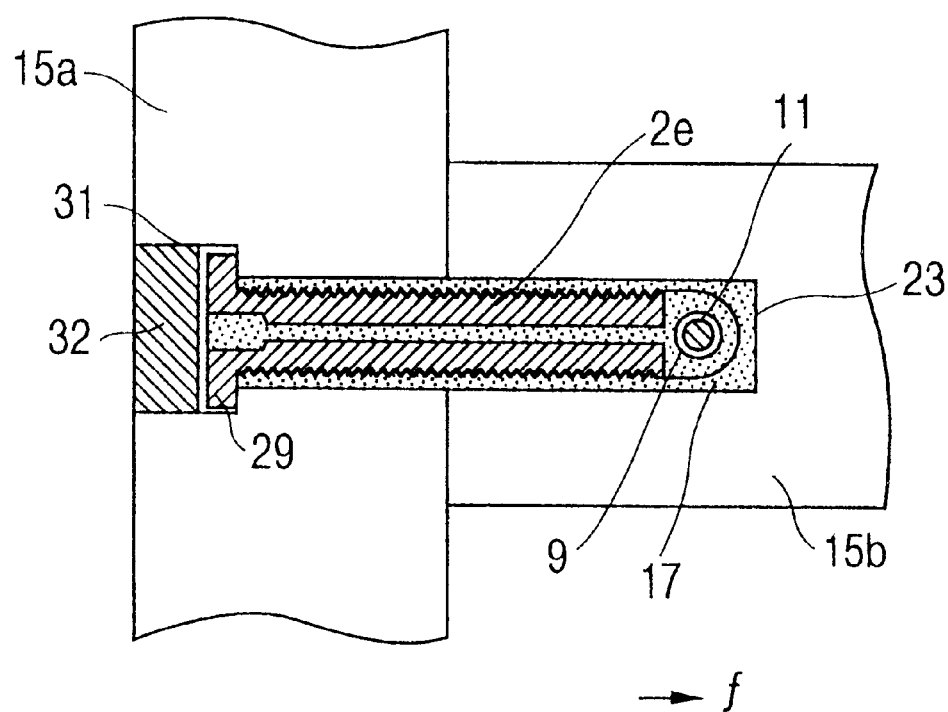
FIG. 14 is a side elevational view in section for showing a substantial central part of a connected part so as to illustrate a state of joint connection using the connector of the sixth preferred embodiment of the present invention.

FIG. 14 is a side elevational view in section for showing a substantial part so as to illustrate a state of the joint connection using the connector of the sixth preferred embodiment of the present invention.

9 denotes the insertion hole for fixing member; 11 a fixing member; 15a an independent column; 15b a lateral beam; 17 a connection hole, wherein these are the same as those shown in the Example of Connection 1, so the same reference numerals are applied to them and their description will be eliminated. 2e denotes a rod-like member of the connector 1e of the sixth preferred embodiment; 29 a flange integrally formed at the end part of the rod-like member 2e; 31 a double-stage depth part formed to be expanded more than the connection hole 17 storing the flange 29; and 32 a plug. A connecting method is carried out in the same manner as that of the example of connection 1.

As described above, according to the present example of connection, there is formed the flange 29, so that even if the external force is applied in a direction (f) as viewed in the figure, the flange 29 abuts against the double-stage depth 31, the connector is not pulled out of the independent column 15, resulting in that a quite safe connected structure can be attained. In addition, since the connector is fixed by the fixing member 11 and the flange 29, it is possible to make a connected structure having a superior withstand force.

DESCRIPTION OF REFERENCE SIGNS 1, 1a, 1b, 1c, 1d, 1e connector
2, 2a, 2b, 2c, 2d, 2e rod-like member
3 hollow part of rod-like member
4 adhesive agent flowing-out hole
5 convex or concave portions
6 opening part
7, 7a branch pipe engaging part
8, 8a convex wall part
8b projections
9 insertion hole for fixing member
10 adhesive agent guiding groove
11 fixing member
12 branch pipe
12a engaging groove
13 hollow part of branch pipe
14 engaging part
15a independent column (long column)
15b lateral beam
16 joint connecting surface
17, 17a connection holes
18 hole openings
19, 19a plugs
20 insertion and fixing part
21 plug for insertion and fixing part
22 adhesive agent pouring gun
23, 23a adhesive agent
24a, 24b beam members
25 branch pipe installing groove
26 opening part
27 adhesive agent flowing-out hole
27a adhesive agent flowing-out groove
28 fixing member
28a convex or concave part for flowing-out adhesive agent
29 flange
30 recess
31 double-stage depth part
32 plug

What is claimed is:

1. A connector comprising a rod-like member having a uniform outer radial dimension from a first end of said rod-like member to a second end thereof; one or two arcuate convex walls cooperatively arranged at said first end of said rod-like member; a hollow passage formed in said rod-like member extending through said first end and from said first end of said rod-like member to said second end thereof; an insertion hole for a fixing member formed through said arcuate convex walls; and a hollow branch pipe removably engaged with an opening of said hollow passage at said second end.

2. The connector according to claim 1 further comprising an exterior surface of said rod-like member which is formed with a plurality of projection parts.

3. The connector as recited in claim 1 wherein said arcuate convex walls further define a slot in the end of said rod-like member, said slot communicating with said hollow passage.

4. The connector according to claim 1 wherein said opening of said hollow passage of said rod-like member at an end part of an engaging part of the branch pipe is provided with a projection formed in parallel direction with a direction which said fixing member is inserted into the insertion hole or a flange part having a recess formed therein in a crossing direction with the direction which said fixing member is inserted into said insertion hole.

5. The connector according to claim 4 further comprising an exterior surface of said rod-like member which is formed with a plurality of projection parts.

6. A connection between a first and second solid structural members wherein a first said member is provided with a through hole and a second said member has a bore hole and said through hole and said bore hole are opposite and axially aligned and further comprising a connector as recited in claim 1 and a liquid adhesive filled within said rod-like member of said connector and a clearance between the exterior surface of said connector and inner walls of said through hole and said bore hole, and said fixing member comprising a locking pin intersecting said rod-like member near said first end.

7. A method of connecting two solid structural members comprising providing a bore hole and a through hole, abutting said bore hole and said through hole so that said holes are in axial alignment, inserting said rod-like member of said connector as described in claim 1 within said bore hole and through said through hole, providing an insertion and fixing hole transversely intersecting with said bore hole, inserting said fixing member comprising a locking pin through said insertion and fixing hole to engage said rod-like member, filling said rod-like member with liquid adhesive wherein said adhesive flows through said hollow passage of said rod-like member to a deep region of said bore hole and then returns toward a non-abutting surface, filling a clearance between the exterior surface of said rod like member and inner walls of said bore hole and said through hole.

8. A connector comprising a rod-like member having a uniform outer radial dimension from a first end of said rod-like member to a second end thereof, a hollow passage formed in said rod-like member extending through said first end and from said first end of said rod-like member to said second end thereof; an insertion hole formed at said first end of said rod-like member transversely intersecting the axial direction of said rod-like member and, a fixing member having a smaller diameter than the diameter of said insertion hole whereby said insertion hole can receive said fixing member, and a hollow branch pipe removably engaged with an opening of said hollow passage at said second end of said rod-like member.

9. The connector according to claim 8 further comprising an exterior surface of said rod-like member which is formed with a projection part or a concave part.

10. The connector according to claim 8 wherein said opening of said hollow passage of said rod-like member at an end part of an engaging part of said branch pipe is provided with a projection formed in parallel with a direction which said fixing member is inserted into said insertion hole or a flange part having a recess formed therein in a crossing direction with the direction which said fixing member is inserted into said insertion hole.

11. The connector according to claim 10 further comprising an exterior surface of said rod like member which is formed with a plurality of projection parts.

12. A connector assembly for the attachment of solid structural members comprising, a hollow elongate rod-like member having a uniform outer radial dimension from one end of said member to a distal end of said member, said hollow elongate rod-like member defining a hollow passage extending from said one end through said distal end, means to provide for an unimpeded flow of adhesive from said distal end of said hollow elongate rod-like member in a radial direction, an insertion hole transversing said hollow elongate rod-like member at said distal end, an elongate fixing member, said elongate fixing member receivable in said insertion hole, and a hollow branch pipe, said branch pipe communicating with said hollow passage in said hollow elongate rod-like member.

13. A connection between two solid structures comprising connector assembly as recited in claim 12, further comprising an adhesive, said adhesive filled within said hollow passage provided through said rod-like member and in a space defined by the exterior surface of said rod-like member and the inner walls of connection holes formed within said solid structural members.

14. A method for connecting a building structure comprising the steps of inserting a rod-like member of a connector between two or more structural members provided with connection holes for inserting and fixing said connector; inserting a fixing member into an insertion and fixing hole formed through an extremity end of one of said connection holes from an outer wall part of the structural member and into an insertion hole for said fixing member formed at an end part of an adhesive agent flowing-out side of said rod-like member; feeding adhesive agent from an adhesive agent flowing-in side of a hollow part of said rod-like member, flowing out said adhesive agent from the adhesive agent flowing-out side of said rod-like member, filling the adhesive agent to a clearance between the exterior surface of said connector and inner walls of said connection holes of said structural members and returning the adhesive agent to the adhesive agent flowing-in side.

* * * * *